United States Patent Office 3,555,063
Patented Jan. 12, 1971

3,555,063
METHOD FOR PREPARING SILOXANE-POLYOXYALKYLENE COPOLYMERS
Isao Nakajima, Niichiro Suzuki, Makio Yamaguchi, and Kiyohire Kondo, Gunma-ken, Japan, assignors to Shin-Etsu Chemical Co., Tokyo, Japan
No Drawing. Filed Dec. 4, 1967, Ser. No. 687,489
Claims priority, application Japan, Mar. 6, 1967, 42/14,080
Int. Cl. C07f 7/18
U.S. Cl. 260—448.8          16 Claims

ABSTRACT OF THE DISCLOSURE

A method for preparing siloxane-polyoxyalkylene copolymers having high storage stability which comprises substituting chlorine for hydrogen in organohydrogen siloxane polymers containing hydrogen atoms directly bonded to silicon atoms, and then reacting the polymers with a hydroxypolyoxyalkylene compound in the presence of organic amines, and neutralizing them with basic compounds of alkali metals or of alkaline earth metals in the presence of alcohols. The copolymers according to the invention are useful as additives to paints, antifog agents, and the like and are particularly recommended as surfactants for the manufacture of polyurethane foams for their foam-stabilizing effect.

---

This invention relates to a method for preparing siloxane-polyoxyalkylene copolymers and relates more particularly to an improved method for preparing copolymers useful as surfactants to be employed in the manufacture of polyurethane foams.

It is known that siloxane-polyoxyalkylene copolymers are useful as release agents, antifog agents, lubricants, additives to paints, etc.; and it is also known that, of these uses, the most important one is as foam stabilizers in polyurethane manufacture. Consequently, several types of siloxane-polyoxyalkylene copolymers have already been introduced, which are classified in two groups, depending on the type of bonding between the siloxane part and the polyoxyalkylene part, the former being SiOC type and the latter, SiC type.

The copolymers of the first type are usually prepared by dealcoholating organosiloxane, containing alkoxy groups, and a hydroxypolyoxyalkylene compound in the presence of an acid catalyst, particularly in the presence of trifluoroacetic acid (cf. U.S.P. 2,917,480 and U.S.P. 2,834,748). However, in this method, the reaction takes as long as from 3 to 16 hours, and the catalyst cannot be completely removed from the reaction product even by neutralization, so that the storage stability of the copolymers becomes poor. Sometimes, the foaming efficiency of the products is reduced by moisture or heat, or the products may even be gelled or separated into two phases. On the other hand, the copolymers of the second group which are characterized by their SiC bonding are stable in storage, but the manufacturing process is very complicated, so that they are commercially handicapped.

It is the object of this invention to provide a method for preparing siloxane-polyoxyalkylene copolymers having SiOC bonds which is characterized by short reaction time and the absence of such catalysts as will have unfavorable influences on the storage stability of the products. Another object of this invention lies in providing a method for preparing siloxane-polyoxyalkylene copolymers having an excellent storage stability and being useful as surfactants for the manufacture of polyurethane foams.

These objects can be attained by employing a process which comprises reacting organohydrogen siloxane polymers containing hydrogen atoms directly bonded to silicon atoms, with chlorine so as to carry out dehydrochlorination, substituting chlorine atoms for hydrogen atoms directly bonded to silicon atoms, and reacting the resulting organosiloxane polymers, containing chlorine atoms directly bonded to silicon atoms, with hydroxypolyoxyalkylene compounds in the presence of organic amines, and subsequently neutralizing the copolymers obtained with basic compounds of alkali metals or of alkaline earth metals in the presence of alcohols.

With regard to the processes of preparing organosiloxane polymers containing chlorine atoms directly bonded to silicon atoms, which are employed in the method of the invention, such processes as partially hydrolyzing organochlorosilanes (cf. French Patent 938,822) or a process of subjecting halogenosilanes and organosiloxanes to equilibration reaction are known. In carrying out the former partial hydrolyzation reaction, it is difficult to control the reaction conditions, as well as to optionally select the number of chlorine atoms to be contained in siloxane molecules, and moreover, it is inferior in reproducibility; while the latter process of equilibration takes as long as over 100 hours to be carried out, so that it is disadvantageous from the industrial point of view. Furthermore, the products prepared by the process are apt to contain halogenosilanes and organosiloxanes, containing no chlorine, which are inadequate for the production of siloxane-polyoxyalkylene copolymers.

In accordance with the method of the invention, when hydrogen-siloxane polymers containing at least one hydrogen atom directly bonded to silicon atom are reacted with chlorine in the absence of moisture, chlorine atoms can be easily and with good reproducibility substituted in optional ratios for the hydrogen atoms directly bonded to the silicon atoms.

The starting material, an organohydrogen-siloxane polymer, is prepared by cohydrolyzing the mixture of an organohydrogen silane represented by a general formula $R_aSiH_bX_{4-a-b}$ (where R is a monovalent hydrocarbon group, X is a hydrolyzable group, $a=0$, 1 or 2, $b=1$ or 2, and $a+b \leq 3$) and an organosilane represented by a general formula $R'_cSiX_{4-c}$ (where R' is a monovalent hydrocarbon group, X is a hydrolyzable group, $c=0$, 1, 2 or 3) in operational ratios; another way is mixing an organohydrogen siloxane having a general formula

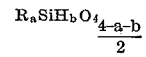

(where R is a monovalent hydrocarbon group, $a=0$, 1 or 2, and $b=1$ or 2, and $a+b \leq 3$) and an organosiloxane represented by a general formula

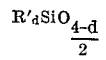

(where R' is a monovalent hydrocarbon group and $d=1$, 2 or 3) at optional ratios, and subjecting the mixture to equilibration reaction in the presence of an acid catalyst, such as sulfuric acid. Said organohydrogen siloxane polymers can be straight-chained or branched, and their hydrogen atoms are directly bonded to silicon atoms or a siloxane chain. Organic groups of said organohydrogen siloxane polymers are represented by alkyl, such as methyl, ethyl, propyl and butyl; aryl, such as phenyl an dnaphthyl; aralkyl such as benzyl, xylyl, and phenyl ethyl; cycloalkyl such as cyclopentyl and cyclohexyl; and fluorine-containing aliphatic groups such as the 3,3,3-trifluoropropyl group. Said organohydrogen siloxane polymers are fluid compounds having at least 4 organosiloxy groups and at least one hydrogen atom per molecule.

The chlorine-substituting reaction is carried out by directly passing dry chlorine gas over the organohydrogen siloxane polymers, or by mixing the organohydrogen siloxane polymers and a solution prepared by having chlorinated hydrocarbon absorb dry chlorine gas, thereby removing hydrochloric acid from the polymers. This reaction is extremely vigorous and usually can be carried out in one hour or more at room temperature, although depending a great deal on the quantity of the chlorine gas and the hydrogen content of the organohydrogen siloxane polymer. In such a case, if necessary, a Friedel-Craft's catalyst, such as aluminum chloride, may be employed in the amount of less than 5 weight percent based on said organohydrogen siloxane, which will further promote the reaction; and if the reaction is carried out in the presence of oxygen in chlorine gas (more than 0.1 percent by volume of oxygen per chlorine gas) or in the presence of sulfur (more than 0.01 percent by weight of sulfur per hydrogen siloxane polymer), the side reaction such as chlorination of hydrocarbon groups and others may be prevented. However, if moisture should be present in the reaction system, the chlorine groups in the reaction products will be easily hydrolyzed or the cleavage of siloxane chain may take place by the action between water and hydrogen chloride gas generated during the reaction, so that special care must be taken not to mix water or moisture with the system.

Subsequently, the organosiloxane containing chlorine atoms directly bonded to silicon atoms is to be reacted with hydroxypolyoxyalkylene compounds, which reaction must be carried out in the presence of organic amines. In the presence of such organic amines, the reaction proceeds quantitatively and rapidly, e.g., it will be completed with agitation in 5-60 minutes at room temperature.

It is possible to carry out the reaction in the absence of a solvent, but the use of a solvent will not only enable the dehydration of the system to be carried out easily and the reaction to proceed rapidly and uniformly, but also make it easy to remove hydrochloric acid, produced by the reaction, so that the reaction should be conducted as much as possible in the presence of a solvent. Hydroxypolyoxyalkylene employed in the reaction is a copolymer, possessing, as an oxyalkylene group, oxyethylene and/or oxy-1,2-propylene, which is represented by the following general formula:

$$H(OCH_2CH_2)_p-(O-CH-CH_2)_q-R$$
$$\phantom{H(OCH_2CH_2)_p-(O-)}CH_3$$

(where $p$ and $q$ are integers of 0 or 1, or more than 1, but which are never 0 at the same time, R is a hydroxy group or dehydrogenated residue of an alcohol, carboxylic acid, or amine containing an active hydrogen atom having reactivity with a alkylene oxide).

In mixing the above-mentioned organosiloxane polymers and hydroxypolyoxyalkylene compounds, the latter serve as a diluent for the copolymer, and when the mol ratio of the hydroxypolyoxyalkylene compounds per chlorine atom contained in the organosiloxane is below 1, unfavorable properties will be acquired by the products, so that the ratio should be from 1.05 to 1.5 mols.

In the reaction, aromatic amines or nitrogen-containing heterocyclic compounds are employed as dehydrochlorinating agents.

If ammonia or aliphatic amines such as ethylamine and triethylamine are employed, their basicities are so strong that the obtained copolymers are apt to be decomposed in the after-treatment thereof, after the reaction is finished, while the above-mentioned amines are free from such defects. These organic amines include aromatic amines such as aniline, toluidine, methylaniline, dimethylaniline, phenylenediamine, diphenylamine and triphenylamine; and pryidine and quinoline and their derivatives such as picoline, lutidine, collidine, isoquinoline, quinaldine and acridine. The amount of the amine to be added is to be more than 1, preferably, from 1.1 to 1.5 mols of it per mol of chlorine atom contained in the chlorine-containing organosiloxane polymer. In view of the necessity of removing the amine after reaction, an amine whose boiling point is below 220° C. should be employed, so that taking these into consideration, pyridine, picoline and dimethylaniline are most recommendable.

As mentioned before, it is preferred for the reaction to be carried out in the presence of some solvent which is inert to hydrogen chloride and which is selected from the group consisting of aromatic hydrocarbons such as benzene, toluene, and xylene, and aliphatic hydrocarbons such as n-hexane, and ligroin, and alicyclic hydrocarbons such as cyclohexane.

When the reaction is carried out by the process of the invention, the aromatic amine and hydrochloride thereof must be removed from the reaction product, so that in the first place, the reaction product is subjected to filtration by which most of the aromatic amine and hydrochloride thereof are removed. Then the filtrate is neutralized in the presence of alcohol with a basic compound of an alkali metal or of an alkaline earth metal, and subsequently the basic compound is removed, followed by the removal of the solvent and alcohol.

The process of the invention is proposed to prepare siloxane-polyoxyalkylene copolymers of improved storage stability. Siloxane-polyoxyalkylene copolymers prepared by ordinary processes cannot stand long storage and become turbid after 1–10 days storage, with their viscosities increasing gradually. This seems to be because in the products prepared by the processes other than that of the invention, a small amount of chlorine remains in the siloxane-polyoxyalkylene copolymers which gradually causes the viscosity of the products to increase. If, for the purpose of carrying out a complete neutralization of the products, some substance of strong basicity, such as an alkali metal only, is mixed with the reaction product with vigorous agitation, the siloxane bonds in the copolymers may be cleaved or the SiOC bond which links siloxane and polyoxyalkylene may be broken, giving low molecular weight substances. However, by the method of the invention, the presence of alcohol enables the neutralization to proceed uniformly and smoothly, and the use of a basic compound of an alkali metal or an alkaline earth metal makes the neutralization proceed with comparative mildness and completeness, resulting in no side reaction such as cleavage of the siloxane bonds, and the products obtained have excellent storage stability.

Alcohols employed in the process of the invention may preferably be aliphatic alcohols having from 1 to 6 carbon atoms. If aliphatic alcohols having 7 or more carbon atoms are used, the effect of neutralization they give becomes rather weak; moreover, such alcohols have high boiling points so that it is difficult to remove them in the final treatment of the products. The amount of alcohols used for the purpose should be from 0.1 to 20 percent, preferably from 1 to 10 percent, by weight of that of the reactants. Illustrative of the basic compounds employed in the process are sodium hydroxide, potassium hydroxide, calcium hydroxide, sodium carbonate, potassium carbonate, sodium bicarbonate, potassium bicarbonate, calcium bicarbonate, calcium oxide and magnesium oxide. Any of them, or any mixture of two or more of them, may be added to the reactants in amounts from 0.1 to 15 percent by weight, preferably from 1 to 5 percent by weight, of the amount of the total reactants.

The structures of siloxane-polyoxyalkylene copolymers prepared by the process of the invention are as follows:

I
$$R_3Si-(O\underset{|}{\overset{R}{Si}})_p-(O\underset{|}{\overset{R_2}{Si}})_q-OSiR_3$$
$$\phantom{R_3Si-(OSi)_p-}(OC_nH_{2n})_mR'$$

II
$$R_2Si-(O\underset{|}{\overset{R_2}{Si}})_r-(O\underset{|}{\overset{R}{Si}})_s-O\overset{(OC_nH_{2n})_mR'}{\underset{|}{Si}}R_2$$
$$\phantom{R_2Si-}(OC_nH_{2n})_mR'\ (OC_nH_{2n})_mR'$$

III

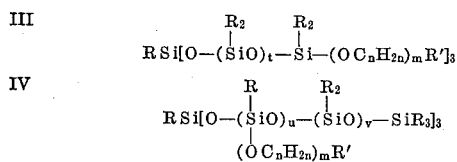

IV
$$RSi[O-(\overset{R}{\underset{|}{Si}}O)_u-(\overset{R_2}{\underset{|}{Si}}O)_v-SiR_3]_3$$
$$(\overset{|}{O}C_nH_{2n})_mR'$$

(where R represents a monovalent hydrocarbon group, R' is a hydroxy group or the dehydrogenated residue of an alcohol, carboxylic acid or amine, and $n$ stands for 2 or 3 and $p, q, r, s, t, u, v$ and $m$ for integers more than 1).

By selecting a proper siloxane component and a polyoxy alkylene component having the above-given structures, the copolymers prepared may be advantageously put to various known uses such as additives to paints, antifog agents, release agents, and lubricants. However, they are particularly recommended as surfactants for the manufacture of polyurethane foams because of their superior foam-stabilizing properties. As indicated below, even a small amount of them gives an excellent foam-stabilizing effect when added to the polyurethane foam material. Furthermore, they show good stability against heat and water, so that they can stand a long storage.

The invention is further illustrated by the following examples. It is to be understood, however, that these examples are included merely for the purpose of illustration and that they are not to be construed as limiting the scope of the invention.

EXAMPLE I 310 g. of tris-(trimethylsiloxy)-methylsilane $$CH_3Si[OSi(CH_3)_3]_3$$

1480 g. of dimethylsiloxane $[(CH_3)_2Si-O]_n$ and 180 g. of methylhydrogensiloxane $(CH_3SiHO-)_n$ were put in a reaction vessel having a capacity of 3 liters, and were subjected to equilibration reaction, employing sulfuric acid as a catalyst. After 8 hours reaction at 50° C., the product obtained was repeatedly washed with water until the washing water became neutral, and then volatile matters were removed, obtaining 1900 g. of partially hydrogenated methyl siloxane.

1400 g. of the partially hydrogenated methyl siloxane and 1 g. of sulfur were filled into a reaction vessel having a capacity of 2 liters, and while keeping the temperature of the mixture at 40–50° C., 222 g. of chlorine gas was slowly blown in, as the mixture was agitated for about 1 hour, so that chlorination of Si—H groups might be carried out. After the reaction was finished, the chlorine gas dissolved in the reaction product was removed, and sulfur was filtered off, obtaining partially chlorinated methyl siloxane with a viscosity of 28.0 cs. (at 25° C.), a specific gravity of 1.030, a refractive index $n_D^{25}$ of 1.4143, and SiCl content of 1.45 mol eq./g.

Subsequently, 400 g. of polyoxyethylene polyoxypropylene glycol monobutyl ether having an average molecular weight of 2300, and the ratio of oxyethylene groups to oxypropylene groups of 50/50, where introduced into a reaction vessel having a capacity of 2 liters, and with an addition of 800 g. of toluene were heated with agitation, removing moisture contained in polyoxyethylene polyoxypropylene glycol monobutyl ether and in the toluene by azeotropy. Then 20 g. of picoline and 120 g. of said partially chlorinated methyl siloxane were added to the reaction mixture, and agitated for 15 minutes to carry out the reaction at room temperature. After the reaction, picoline hydrochloride was separated, and the solution was placed in a reaction vessel having a capacity of 2 liters, and with an addition of 60 g. of ethyl alcohol and 20 g. of sodium bicarbonate, was heated at 60° C. for 60 minutes in order to carry out neutralization. After the neutralization, sodium bicarbonate was separated, and toluene, ethanol and the remaining picoline were removed by heating under reduced pressure, obtaining 500 g. of transparent, pale yellow liquid, which was siloxane-polyoxyalkylene copolymer, with the following properties; viscosity: 1020 cs., specific gravity (at 25° C.): 1.060, pH: 6.8, and OH value: 5.2.

EXAMPLE II

A mixture of 30 mols of dimethyldichlorosilane, 2 mols of trimethylchlorosilane, and 4 mols of methylhydrogen dichlorosilane was cohydrolyzed, and 1400 g. of partially hydrogenated methylsiloxane prepared was placed into a reaction vessel having a capacity of 2 liters, and keeping the temperature of the mixture at 55–60° C., a mixture of 160 g. of chlorine gas and dry air in the ratio of 10:1 were blown in, for 2 hours with agitation. After the reaction was carried out, chlorine gas dissolved in the reaction product was driven out, obtaining partially chlorinated methyl siloxane, having a viscosity of 33 cs. (at 25° C.), a specific gravity of 1.034, a refractive index $n_D^{25}$ of 1.4145, and Si-Cl content of 1.42 mol eq./g.

400 g. of polyoxyethylene polyoxypropylene glycol monoacetic acid ester, having an average molecular weight of 1560 and the ratio of oxyethylene groups to oxypropylene being 55/45, were placed into a reaction vessel having a capacity of 2 liters, and with an addition of 800 g. of toluene were heated to remove moisture. Subsequently 25 g. of picoline and 170 g. of the above-mentioned partially chlorinated methyl siloxane were added to it and reacted for 10 minutes at 30° C. After the reaction, picoline hydrochloride generated was separated and 1280 g. of it were placed into a reaction vessel having a capacity of 2 liters and with an addition of 50 g. of isopropanol and 50 g. of potassium carbonate were heated at 80° C. with agitation for 30 minutes for neutralization. After the neutralization, potassium carbonate was separated, and toluene, isopropanol and remaining picoline were removed by heating under reduced pressure, obtaining 497 g. of a transparent, pale yellow liquid, which was siloxane polyoxyalkylene copolymer having the following physical properties; viscosity: 1.470 cs. (at 25° C.), specific gravity: 1.053 (at 25° C.), pH: 6.2, and OH value: 5.4.

EXAMPLE III 400 g. of polyoxyethylene polyoxypropylene glycol monobutyl ether, having an average molecular weight of 1850 and the ratio of oxyethylene groups to oxypropylene groups being 45/55, were filled into a reaction vessel having a capacity of 2 liters and with an addition of 800 g. of toluene were heated with agitation so that moisture might be removed by the azeotropy with toluene. Subsequently, 20 g. of pyridine and 140 g. of partially chlorinated siloxane prepared by chlorinating, by the method described in Example II, partially hydrogenated siloxane which was prepared by cohydrolyzing the mixture of 21 mols of dimethyl dichlorosilane, 1 mol of methyl trichlorosilane, and 3 mols of dimethyl hydrogen monochlorosilane, were added to the reaction product, and were reacted at 25° C. for 10 minutes with agitation. After separating the white precipitate of pyridine hydrochloride generated, 1260 g. of the filtrate were placed into a reaction vessel, having a capacity of 2 liters, and with an addition of 60 g. of isobutanol and 60 g. of sodium carbonate, were heated at 60° C. with agitation for 90 minutes in order to carry out neutralization. Following the neutralization, sodium carbonate was separated, and then toluene, isobutanol and the remaining pyridine contained in the reaction product were removed by heating under reduced pressure, obtaining 480 g. of transparent, pale yellow siloxane polyoxyalkylene copolymer, having the following physical properties. Viscosity: 120 cs. (at 25° C.), specific gravity: 1.029 (at 25° C.), pH: 6.0 and OH value: 7.5.

EXAMPLE IV (In this description all proportions are by weight, unless otherwise indicated.)

100 parts of polyether triol of molecular weight of 3000, prepared by the addition of propylene oxide to glycerol, 4.5 parts of water, 0.1 part of triethylene diamine, 10 parts of monofluorotrichoromethane, and 0.25 part of stannous octoate, were uniformly mixed. Two kinds of surfactants of typical nature and generally in use, viz., SiOC bonded siloxane-polyoxylalkylene copolymer obtained by the reaction of alkoxy silane and polyoxyethylene polyoxypropylene glycol monoether in the presence of an acid catalyst (hereinafter called Agent A in general use) and SiC bonded siloxane polyoxyalkylene copolymer (hereinafter called Agent B in general use) and the siloxane-polyoxyalkylene copolymers prepared by the processes given in Examples I, II and III, were each added in the amounts given in Table 1 to portions of the mixture prepared as given above. After well-mixed mixtures were prepared, 55 parts of a mixture of 80 parts of the 2,4 tolylenediisocyanate and 20 parts of 2,6 tolylenediisocyanate were added to each mixture and agitated for 7 seconds, and then poured into an open mold and allowed to foam. The results obtained are tabulated in Table 1.

EXAMPLE VI 2 mols of dimethyl monochlorosilane, 2 mols of methyl dichlorosilane and 3 mols of dimethyl dichlorosilane were cohydrolyzed, and the dimethyl siloxane obtained, containing terminal and non-terminal silicon atom-bonded hydrogen, was chlorinated by the method given in Example II, synthesizing partially chrorinated dimethyl siloxane. On the other hand, 200 g. of polyoxyethylene glycol monomethyl ether having an average molecular weight of 500, was placed in a 1 liter reaction vessel, and with an addition of 500 g. of toluene, heated with agitation in order to carry out dehydration by azeotropy, and then was cooled. 510 g. of dimethyl aniline were added to it, and with an addition of 65 g. of the above-mentioned partially chlorinated dimethyl siloxane were reacted with agitation at 40° C. for 30 minutes. A white precipitate formed, which was filtered off, and 600 g. of the filtrate were introduced into a 1 liter reaction vessel, to which were added 30 g. of isopropanol and 30 g. of sodium carbonate. After the mixture was heated with agitation

TABLE 1

| | Amounts of the surfactants employed and the results obtained |
|---|---|
| Kinds of the surfactants: | |
| Copolymer of Example I | 0.3 part good, 0.2 part, collapsed. |
| Copolymer of Example II | Do. |
| Copolymer of Example III | Do. |
| Agent A in general use | 0.7 part, good; 0.6 part, broken in one part. |
| Agent B in general use | 0.6 part, good; 0.5 part, collapsed. |

The copolymers and the agents given in the table were kept in a closed vessel at 35° C. in an atmosphere having a relative humidity of 90 percent and at 70° C., respectively, to test the storage stabilities; the results given in Table 2 were obtained.

at 60° C. for 90 minutes for neutralization, the precipitate was filtered off, and the solvent and the unreacted amine were removed at 140° C. under reduced pressure of 1 mm. Hg, obtaining 220 g. of transparent brown reaction product, which was an oily siloxane-polyoxyalkylene co-

TABLE 2

| | Condition of storage—Test results | |
|---|---|---|
| Surfactants | 35° C. and relative humidity of 90% | In an atmosphere of 70° C. |
| Copolymer of Example I | No change in either appearance or performance after 60 days storage. | No change in either appearance or performance after 60 days storage. |
| Copolymer of Example II | do | Do. |
| Copolymer of Example III | do | Do. |
| Agent A in general use | Performance was much degraded in 10 days and the agent was separated in two layers after 25 days storage. | Performance was rather degraced in four days, and the agent was gelled in 15 days. |
| Agent B in general use | Performance was degraded in 30 days | No change in either appearance or performance in 30 days, but performance was degraded in 35 days. |

EXAMPLE V

Siloxane-polyoxyalkylene copolymer solutions prepared by the process of Example I, not subjected to neutralization, were neutralized by various methods, and the performances and stabilities (at 70° C.) of the copolymers obtained were compared, as given in Table 3.

polymer, having a melting point of 22° C., a specific gravity of 1.05, pH of 6.1 and OH value of 8.0.

EXAMPLE VII

A mixture of 7 mols of diphenyl dichlorosilane, 17 mols of dimethyl dichlorosilane, 3 mols of methyl hydrogen dichlorosilane and 2 mols of trimethyl monochorosilane

TABLE 3

| Neutralizing agent | Amount, percent | Neutralizing conditions | Result obtained of copolymers |
|---|---|---|---|
| | | Untreated | Became very turbid when allowed to stand for one day. In 3 days, the performance was impaired. |
| Potassium carbonate | 5 | 100° C., 60 mins | Became slightly turbid in one day. The performance was a little impaired in 5 days. |
| Isopropanol | 5 | 80° C., 60 mins | Not completely neutralized (because of low pH of isopropanol). The performance was impaired in 10 days. |
| Ammonia | | 30° C., 60 mins. (blown in). | Became turbid in 2 days. The performance was also a little impaired. |
| Potassium carbonate | 4 | 80° C., 30 mins | No change either in appearance or performance after 60 days storage. |
| Isopropanol | 4 | do | |
| Sodium carbonate | 4 | do | Do. |
| n-Propanol | 4 | do | |
| Sodium bicarbonate | 4 | 60° C., 60 mins | Do. |
| Ethanol | 2 | do | |
| Potassium acetate | 2 | do | Viscosity became a little high in 40 days. No change in performance and transparency. |
| Isopropanol | 2 | do | |
| Calcium hydroxide | 2 | do | No change either in appearance or performance after 60 days storage. |
| Ethanol | 4 | do | |
| Sodium hydroxide | 0.5 | 30° C., 60 mins | pH was rather high after neutralization, but no change either in appearance or performance after 60 days storage. |
| Isopropanol | 4 | do | | was hydrolyzed, giving a partially hydrogenated methylphenyl siloxane, which had a viscosity of 132 cs., and which will generate 22.5 ml./gr. of hydrogen gas. When chlorine gas containing 1 percent of dry air was blown into it, in order to substituted chlorine for the silicon-bonded hydrogen in the partially hydrogenated methylphenyl siloxane, there was formed chlorinated methylphenyl siloxane having 0.85 mol eq./g. of silicon directly bonded to chlorine and exhibiting a viscosity of 146 cs. To 360 g. of said chlorinated methylphenyl siloxane were added 250 g. of polyoxyethylene glycol monomethyl ether having an average molecular weight of 750, and were reacted, neutralized, and filtered exactly as described in Example I; the product obtained had a viscosity of 29.5 cs. (at 98.9° C.), a melting point of 26° C., a specific gravity of 1.04 and an OH value of 3.0, and it dissolved readily in alcohol and toluene.

EXAMPLE VIII

Employing a chloroplatinic acid as a catalyst, 3 mols of styrene were added to the hydrogen atom bonded to the silicon atom in partially hydrogenated dimethyl siloxane containing 2 mols of $(CH_3)_3SiO_{1/2}$, 12 mols of $(CH_3)_2SiO$ and 6 mols of $CH_3HSi$—, and there was obtained partially hydrogenated methyl siloxane containing phenyl ethyl groups, which generated 37.0 ml./gr. of hydrogen gas and which had a viscosity of 193 cs. and $n_D^{25}$ of 1.4791, When chlorine gas containing 5% of dry air was blown into it, partially chlorinated methylsiloxane was formed, containing a phenyl ethyl group. The viscosity of the reaction product was 207 cs. and the amount of silicon directly bonded to chlorine was 1.56 mol eq./g.

320 g. of said chlorinated siloxane and 200 g. of polyoxyethylene glycol monomethyl ether having an average molecular weight of 400 were reacted, neutralized and filtered as described in Example I with a viscosity of 870 cs., a specific gravity of 1.03, and an OH value of 2.7. This copolymer was soluble in alcohol, and when introduced into water, gave an emulsion by dispersion.

What is claimed is:
1. A method for preparing siloxane-polyoxyalkylene copolymers which comprises reacting in the substantial absence of moisture (a) an organosiloxane polymer containing chlorine atoms directly bonded to silicon atoms, said chlorinated organosiloxane polymer being obtained by chlorinating an organosiloxane polymer having at least one hydrogen atom directly bonded to a silicon atom and having at least 4 organosiloxy groups wherein said organo moieties are selected from the group consisting of alkyl, aryl, aralkyl, cycloalkyl and fluorine-containing aliphatic groups, with (b) a hydroxypolyoxyalkylene compound having the general formula:

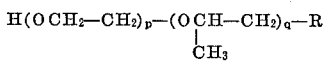

wherein p and q are integers with the proviso that they are never 0 at the same time and R is selected from the group consisting of hydroxy groups and dehydrogenated residues of compounds selected from the group consisting of alcohols, carboxylic acids and amines having active hydrogen atoms reactive with alkylene oxides, said reaction of chlorinated organosiloxane polymer with hydroxypolyoxyalkylene compound being carried out in the presence of an organic amine selected from the group consisting of aromatic amines, nitrogen-containing heterocyclic compounds and alkylates thereof and whose boiling point is below 220° C.; removing the amine hydrochloride formed; and neutralizing the reaction product in the presence of an aliphatic alcohol having from 1 to 6 carbon atoms with a basic compound selected from the group consisting of alkali metal carbonates, bicarbonates, acetates and hydroxides and alkaline earth metal carbonates, bicarbonates, acetates and hydroxides.

2. The method of claim 1 wherein the chlorination is carried out with chlorine in the presence of a gas selected from the group consisting of oxygen and air.

3. The method of claim 1 wherein elemental sulfur is present in the organosiloxane polymer during the chlorination.

4. The method of claim 1 wherein from 1.05 to 1.5 mols of hydroxypolyoxyalkylene compound is added per mol of chlorine atoms contained in the chlorine-containing organosiloxane.

5. The method of claim 1 wherein an organic amine selected from the group consisting of pyridine, picoline and dimethylaniline is used as dehydrochlorinating agent.

6. The method of claim 5 wherein from 1.1 to 1.5 mols of organic amine dehydrochlorinating agent is used per mol of chlorine atoms contained in the chlorine-containing organosiloxane.

7. The method of claim 1 wherein the organosiloxane polymer containing chlorine atoms directly bonded to silicon atoms is reacted with the hydroxypolyoxyalkylene compound in the presence of a hydrocarbon solvent.

8. The method of claim 7 wherein the reaction product is neutralized in the presence of from 1 to 10 percent of aliphatic alcohol with from 1 to 5 percent of the basic compound.

9. A method for preparing siloxane-polyoxyalkylene copolymers which comprises reacting in the substantial absence of moisture (a) an organosiloxane polymer containing chlorine atoms directly bonded to silicon atoms, said chlorinated organosiloxane polymer being obtained by chlorinating an organosiloxane polymer having at least one hydrogen atom directly bonded to a silicon atom and having at least 4 organosiloxy groups wherein said organo moieties are selected from the group consisting of alkyl, aryl, aralkyl, cycloalkyl and flourine-containing aliphatic groups, with (b) a hydroxypolyoxyalkylene compound having an average molecular weight of at most 2300 and having the general formula:

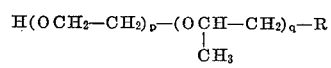

wherein p and q are integers with the proviso that they are never 0 at the same time and R is selected from the group consisting of methoxy, ethoxy and acetoxy groups, said reaction of chlorinated organosiloxane polymer with hydroxypolyoxyalkylene compound being carried out in the presence of an organic amine selected from the group consisting of pyridine, picoline and dimethylaniline; removing the amine hydrochloride formed; and neutralizing the reaction product in the presence of an aliphatic alcohol having from 1 to 6 carbon atoms with a basic compound selected from the group consisting of sodium bicarbonate, potassium carbonate, potassium acetate, sodium carbonate, calcium hydroxide and sodium hydroxide.

10. The method of claim 9 wherein the chlorination is carried out with chlorine in the presence of a gas selected from the group consisting of oxygen and air.

11. The method of claim 9 wherein from 1.05 to 1.5 mols of hydroxypolyoxyalkylene compound is added per mol of chlorine atoms contained in the chlorine-containing organosiloxane.

12. The method of claim 9 wherein elemental sulfur is present in the organosiloxane polymer during the chlorination.

13. The method of claim 9 wherein from 1.1 to 1.5 mols of organic amine dehydrochlorinating agent is used per mol of chlorine atoms contained in the chlorine-containing organosiloxane.

14. The method of claim 9 wherein the organosiloxane polymer containing chlorine atoms directly bonded to silicon atoms is reacted with the hydroxypolyoxyalkylene compound in the presence of a hydrocarbon solvent.

15. The method of claim 9 wherein the reaction product is neutralized in the presence of from 1 to 10 percent of aliphatic alcohol with from 1 to 5 percent of the basic compound.

16. The method of claim 14 wherein said hydrocarbon solvent is selected from the group consisting of benzene, toluene, xylene, n-hexane, ligroin and cyclohexane.

References Cited

UNITED STATES PATENTS 3,272,762   9/1966   Ibbotson et al. ____ 260—448.8X

OTHER REFERENCES

Bazant et al., "Organosilicon Compounds," 1, Academic Press Inc., N.Y. (1965), pps. 130–131.

TOBIAS E. LEVOW, Primary Examiner

P. F. SHAVER, Assistant Examiner

U.S. Cl. X.R.

260—824